April 10, 1962 E. F. PIERCE 3,029,079

SPEED ADAPTERS FOR PHONOGRAPHS

Filed Nov. 27, 1959

INVENTOR.

ELVIN F. PIERCE

BY

ATTORNEY 3,029,079
SPEED ADAPTERS FOR PHONOGRAPHS
Elvin F. Pierce, 2220 N. Garfield St., Loveland, Colo.
Filed Nov. 27, 1959, Ser. No. 855,869
9 Claims. (Cl. 274—9)

This invention relates to a record speed reduction device for use on a phonograph record player which will render the player adaptable for playing records of a slower speed type than those for which it was originally designed.

The principal object of the invention is to provide a simple, lightweight, economical and highly efficient auxiliary turntable device which can be simply placed upon the conventional turntable of a record player to receive records designed for a slower speed and which will automatically rotate the latter records at the proper speed without requiring any changes in the turntable drive mechanism of the record player.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Figure 1:
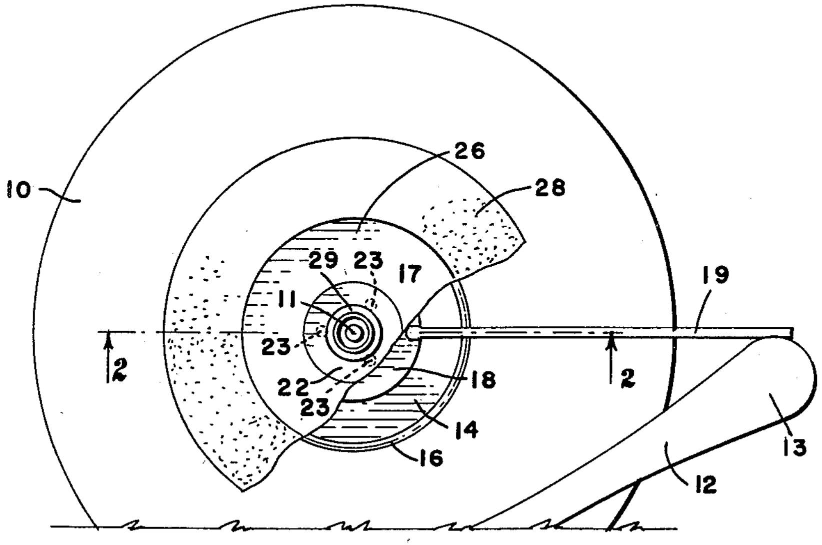
FIG. 1 is a plan view of a turntable and a pickup arm of a conventional record player showing the invention in place thereon partially broken away to illustrate the construction thereof.
Figure 2:
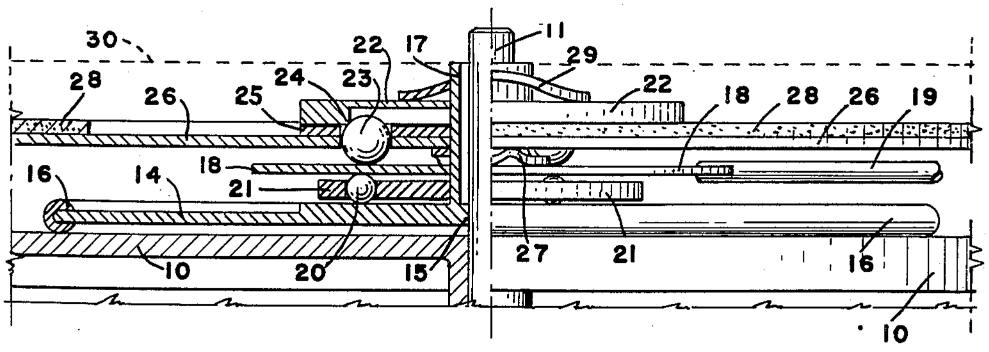
FIG. 2 is a combined side view and cross section of the speed reduction device, the sectional portion of the figure being taken on the line 2—2, FIG. 1.

In the drawing, parts of a conventional phonographic record player are designated by numeral as follows: turntable 10, center post 11, pickup arm 12, and pickup arm post 13. Older style record players rotate their turntables 10 at a speed of approximately 78 r.p.m. Present day records are designed for rotation at lower speeds than this, for instance 45 r.p.m., 33⅓ r.p.m. and 16 r.p.m. This invention can be designed to reduce the record speed of any given turntable to any desired speed, such as, 78 to 45, 33⅓ or 16 r.p.m. The invention will be described as designed to reduce the record speed from 78 r.p.m. to 45 r.p.m.

The invention is designed to be dropped over the center post 11 onto the turntable 10 similarly to the positioning of a conventional phonograph record disc thereon and is designed to receive and support a second record, of a reduced speed variety, over the turntable 10 and to rotate the said second record at a speed lower than the conventional speed of the turntable 10. The invention employs a circular base plate 14 having a center post opening 15. The base plate is designed to rest upon the conventional turntable 10 with the center post 11 projecting upwardly through the opening 15 in a manner similar to a conventional record. The base plate is preferably provided with a rim 16 which may be a rubber ring surrounding the base plate or the edge of the plate may be dipped in latex or other material to provide a cushioned edge to frictionally engage the upper surface of the turntable 10 so as to cause the base plate 14 to rotate simultaneously therewith.

A tubular axis sleeve 17 is mounted or formed on the base plate 14 and arises therefrom in concentric relation to the center post 11. A normally stationary circular traction plate 18 is rotatably fitted over the sleeve 17 and is prevented from rotating therewith by means of a stop arm 19 which is fixedly mounted at its one extremity to the traction plate 18 and which extends radially outward therefrom to swing into engagement with any projecting portion of the record player such as the pickup post 13, as shown in FIG. 1. The traction plate 18 is supported from the base plate 14 upon anti-friction bearing balls 20. As illustrated, there are three of the bearing balls 20 maintained in uniform spaced relation by means of a circular ball separator 21 having openings for receiving the respective balls.

A circular cap plate 22 is rotatably supported upon the traction plate 18 by means of a plurality of similar traction balls 23. As illustrated, three traction balls 23 are employed. The traction balls roll about a circular path on the traction plate 18 and contact the inner lower edge of an annular shoulder 24 extending downwardly from the lower surface of the cap plate 22. The radius of the shoulder ($R^1$ in FIG. 3) is greater than the radius of the roll path of the balls 23 ($R^2$ in FIG. 3) so that the shoulder contacts the balls at a point spaced outwardly from the vertical center line of the balls, as indicated by the space X in FIG. 3.

Figure 3:
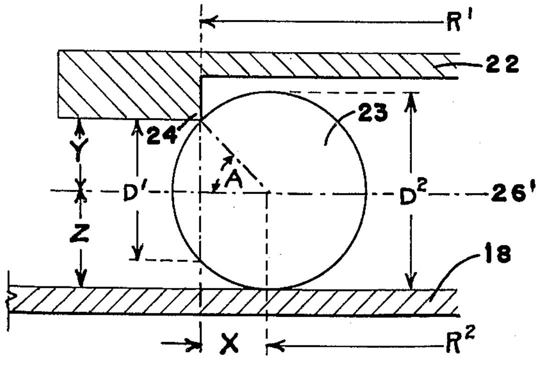
FIG. 3 is a diagram illustrating how the speed reduction is obtained in the device.

A circular record disc 26, having an annular record cushion 28 and having openings for receiving the traction balls 23, is maintained in the horizontal plane of the ball centers, indicated at 26′ in FIG. 3, by means of a resilient rippled spring washer 27 positioned between the record disc 26 and the traction plate 18 about the axis sleeve 17. The record disc 26 is separated from the cap plate 22 by means of a circular friction pad 25 also provided with openings for the traction balls 23. The entire assembly is clamped in superimposed relation on the sleeve 17 in any suitable manner such as by means of a spring lock washer 29 which is forced down over the sleeve 17 against the cap plate 22 and which when released, is self distortable to lock itself to the sleeve 17. The inherent resiliency of the spring washer 27 constantly urges the record disc 26 and the cap plate 22 into frictional engagement with opposite faces of the friction pad 25.

It can be seen that the base plate 14 will rotate with the turntable 10. This rotation will be imparted through the sleeve 17, the lock washer 29, the cap plate 22, and thence to the shoulder 24 so as to cause the balls 23 to roll upon the stationary traction plate 18. It will be noted that the balls roll upon the traction plate 18 about a lever arm equal to their radius, as indicated at "Z" in FIG. 3. It will also be noted that since the shoulder 24 is positioned in "X" spaced relation to the vertical center line of the balls, the shoulder will roll upon the balls upon a lever arm of reduced length, as indicated at "Y" in FIG. 3. This will cause the horizontal center plane 26′ of the balls 23 to move forwardly at reduced speed in the ratio of "Y" to "Z.". Since the record disc 26 is mounted in the plane 26′, and since the balls 23 are positioned in and extend through ball receiving openings in the record disc 26, the latter will therefore move forwardly at this reduced speed causing slippage between the friction pad 25 and the cap plate 22. In other words, the balls 23 will roll on their full diameter ($D^2$ in FIG. 3) whereas the shoulder 24 will roll on a reduced diameter, ($D^1$ in FIG. 3).

Therefore, by trigonometrically solving the angle "A" of FIG. 3 and positioning the shoulder 24 to contact a selected point on the balls, any desired speed reduction can be obtained by varying the quantities in the formula.

Figure 4:
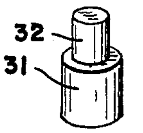
FIG. 4 is a perspective view of an auxiliary attachment for use with the device which will be later described.

The modern 45 r.p.m. records have a center opening much larger than the conventional diameter of the center post 11. The cap plate 22 is made to conform to the center opening in the 45 r.p.m. records so that the latter will fit down about the cap plate 22 upon the cushion 28. 33⅓ r.p.m. records having the small center holes can be placed over the projecting center post 11 with additional cushioning, such as a foam rubber pad, placed upon the record disc 26, as indicated by the broken line 30. In some of the older style, single play turntables, the center post 11 may not project upwardly sufficiently far to project above the top of the sleeve 17. For such a turntable, a plug 31, as shown in FIG. 4, is provided. The plug 31 is of a diameter to fit snugly within the upper extremity of the sleeve 17 and is provided with an upwardly projecting stud 32 of a size to be received in the center hole of conventional 33⅓ r.p.m. records.

While the invention has been described as more particularly applied to reducing the turntable speed of a phonographic record player, the same speed reduction principle could be applied wherever it is desired to drive a driven element at a reduced speed from a driving element. For instance, the turntable 10 could be replaced by any desired driving disc and the record disc could be replaced by a driven disc connected to any desired driven element.

While a specific form of the improvement has been described and illustrated herein, it is to be understood that the same may be varied within the scope of the appended claims, without departing from the spirit of the invention.

Having thus described the invention what is claimed and desired secured by Letters Patent is:

1. A record speed reduction device for use on a record player turntable having a center post comprising: a base plate having a central opening adapted to be positioned on said turntable with the center post extending upwardly through said opening; a vertical cylindrical sleeve affixed to and arising concentrically from said base plate about said central opening; a flat, circular traction plate surrounding said sleeve above said base plate; means preventing said traction plate from rotating with said sleeve; traction balls positioned to roll in a concentric circular path on the upper surface of said traction plate; a record disc adapted to receive a phonograph record rotatably mounted on said sleeve, said record disc having openings in which said traction balls are positioned; a flat circular cap plate mounted on and surrounding said sleeve above said record disc and resting upon and riding in a circular path upon said traction balls; and resilient means urging said cap plate downwardly into rolling contact with and upon said balls.

2. A record speed reduction device as described in claim 1 having means positioned between said traction plate and said record disc and acting to maintain the record disc substantially in the center plane of said balls.

3. A record speed reduction device as described in claim 2 having bearing balls positioned between said base plate and said traction plate so that the former may rotate friction free of the latter.

4. A record speed reduction device as described in claim 3 in which the resilient means comprises an annular distorted spring lock washer mounted on said sleeve above said cap plate and urging the latter downwardly toward said balls.

5. A record speed reduction device as described in claim 4 having a separator positioned between said base plate and said traction plate, said separator having openings for said balls to retain the latter in proper separated positions.

6. A record speed reduction device as described in claim 1 having a downwardly depending annular shoulder formed on the bottom of said cap plate, said shoulder contacting said traction balls at a point positioned radially outward from the path of travel of said balls.

7. A record speed reduction device as described in claim 5 in which the diameter of the circular path of the traction balls on said traction plate is less than the diameter of the circular path of contact between said traction balls and said cap plate.

8. A record speed reduction device as described in claim 1 having an annular shoulder formed on said cap plate, said shoulder riding on said balls in a plane spaced from said traction disc a distance less than the diameter of said traction balls.

9. Means for transmitting rotation from a driving element to a driven element at reduced speed comprising: a drive disc driven by said driving element; a cylindrical member arising concentrically from said drive disc; a traction plate surrounding said cylindrical member; means for preventing said traction plate from rotating with said cylindrical member; traction balls positioned to roll in an annular concentric path on said traction plate, said driven disc having openings in which said traction balls are positioned; a cap plate mounted on said cylindrical member above said driven disc; a shoulder formed on said cap plate riding on said balls, said shoulder contacting said balls in radially spaced relation to the annular path of said balls; and means for transmitting rotation from said driven disc to said driven element.

References Cited in the file of this patent

UNITED STATES PATENTS

| | | |
|---|---|---|
| 2,106,710 | Barton | Feb. 1, 1938 |
| 2,106,722 | Collison et al. | Feb. 1, 1938 |
| 2,579,145 | Hermsen | Dec. 18, 1951 |
| 2,610,258 | Goldmark et al. | Sept. 9, 1952 |